(12) United States Patent
Hawthorne et al.

(10) Patent No.: US 6,332,106 B1
(45) Date of Patent: Dec. 18, 2001

(54) TRAIN HANDLING TECHNIQUES AND ANALYSIS

(75) Inventors: Michael J. Hawthorne, Watertown; Stephen K. Nickles, Burleson, both of NY (US); Bolanle Onodipe, Fort Worth, TX (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/397,667

(22) Filed: Sep. 16, 1999

(51) Int. Cl.$^7$ .................................................. B60L 3/00
(52) U.S. Cl. ......................... 701/19; 701/70; 324/160; 377/24
(58) Field of Search ................................. 701/19, 117, 35, 701/70; 324/160; 377/24, 24.1, 26

(56) References Cited

U.S. PATENT DOCUMENTS

| | | | |
|---|---|---|---|
| 4,041,283 | 8/1977 | Mosier | 235/150.2 |
| 4,042,810 | 8/1977 | Mosher | 235/150.2 |
| 4,181,943 | 1/1980 | Mercer, Sr. et al. | 701/70 |
| 4,236,215 | * 11/1980 | Callahan et al. | 701/117 |
| 4,344,364 | 8/1982 | Nickles et al. | 105/62 |
| 4,602,335 | 7/1986 | Perlmutter | 701/70 |
| 4,735,385 | 4/1988 | Nickles et al. | 246/182 |
| 5,758,299 | 5/1998 | Sandborg et al. | 701/29 |

FOREIGN PATENT DOCUMENTS

| | | |
|---|---|---|
| 114 633 | 8/1984 | (EP) . |
| 257 662 | 3/1988 | (EP) . |
| 539 885 | 5/1993 | (EP) . |
| 0755840 | 1/1997 | (EP) . |
| 2188464 | 9/1987 | (GB) . |
| WO 90/03622 | 4/1990 | (WO) . |

* cited by examiner

*Primary Examiner*—William A. Cuchlinski, Jr.
*Assistant Examiner*—Arthur Donnelly
(74) *Attorney, Agent, or Firm*—Barnes & Thornburg

(57) ABSTRACT

This is a method of analyzing train handling by setting a standard for the run, collecting train operating or handling data from the run and determining operating constraints during the run which are not included in the standard run. The determination of operating constraints during a run also includes determining differences between the operating constraints during the run of those included in the standard. The train handling data is compared to the standard and the comparison is adjusted for the operating constraints. The adjustment of the comparison includes nullifying any deviation of the handling data from the standard resulting from the operating constraints. A report is created from the standard and the handling data correlating the energy usage for specific categories. These categories include one or more of pneumatic braking, dynamic braking and track topology. The report further includes energy adjustments for the operating constraints determined during the run.

27 Claims, 2 Drawing Sheets

| CATEGORY | PLAYBACK DEMAND (HP-HRS) | PLAYBACK FUEL (GALLONS) | OPTIMAL RUN DEMAND (HR-HRS) | OPTIMAL RUN FUEL (GALLONS) |
|---|---|---|---|---|
| AIR BRAKE - SLOW DOWNS | 2009 | 58 | 2200 | 56 |
| AIR BRAKE - BALANCING | 1045 | 30 | 2968 | 75 |
| AIR BRAKE - POWER BRAKING | 206 | 6 | 1 | 0 |
| DYNAMIC BRAKE - SLOW DOWNS | 4602 | 142 | 72.74 | 2 |
| DYNAMIC BRAKE - BALANCING GRADE | 5638 | 174 | 72.74 | 2 |
| DYNAMIC BRAKE - POWER BRAKING | 2 | 0 | 0 | 0 |
| CURVE RESISTANCE | 7930 | 227 | 7913 | 199 |
| GRADE RESISTANCE | -9832 | 0 | -9954 | 0 |
| ROLLING RESISTANCE | 9189 | 264 | 8716 | 220 |
| IDLE FUEL | 0 | 45 | 0 | 39 |
| SUB-TOTAL | 20166 | 947 | 13963 | 645 |
| STOP PENALTY | - | - | - | 82 |
| STOP CREDIT | - | - | - | (0) |
| SLOW DOWN PENALTY | - | - | - | 28 |
| SLOW DOWN CREDIT | - | - | - | (6) |
| TOTAL | | 947 | | 749 |

FIG. 2

TRAIN HANDLING TECHNIQUES AND ANALYSIS

BACKGROUND AND SUMMARY OF THE INVENTION

The present invention relates to train handling techniques and more specifically to the analysis of train handling techniques.

Training systems for locomotive engineers have been well known. A Train Dynamic Analyzer (TDA) is such a training system offered by the Train Dynamic Service Group of New York Air Brake Corporation.

The TDA functionality was enhanced to assist in training the Locomotive Engineer how to better handle their trains. Designs of simulators with math models are shown in U.S. Pat. Nos. 4,041,283; 4,827,438 and 4,853,883. Further capability was added to investigate accidents by playing the event recorder data through the TDA and monitoring critical physical parameters. Through the years, data was collected from instrumented trains and laboratory experiments, allowing the models used by the TDA to be refined. On board data collection for off-loading is shown in U.S. Pat. Nos. 4,561,057 and 4,794,548.

As more Locomotive Engineers became familiar with the TDA display through training sessions, it became apparent that a real time version of the TDA in the cab of a locomotive would offer substantial benefits in improved train handling. Improved train handling would in turn foster safety and economic benefits. Earlier designs for on board computer controllers is shown in U.S. Pat. No. 4,042,810 with a description of math models.

A more advanced version of the TDA for real time on-board display and control is the LEADER system, also available from the Train Dynamic Service Group of New York Air Brake Corporation.

The LEADER system has all the necessary information to predict the future state of the train given a range of future command changes (what if scenarios). With this ability, LEADER system can assist the railroads in identifying and implementing a desired operating goal; minimize time to destination, maximize fuel efficiency, minimize in train forces, (etc.) or a weighted combination thereof. LEADER system will perform calculations based on the operational goal and the current state of the train to make recommendations to the Locomotive Crew on what operating changes will best achieve these goals.

The LEADER system provides safe and effective control of a train through display or control of the dynamically changing parameters. It accurately provides train speed within designated speed limits. It maintains in-train coupling forces with safe limits to prevent train break-in-twos. It maintains safe levels of lateral forces between the wheels and the rails of all cars to prevent cars from departing from the track and derailing. It provides control of slack (draft) action or shock (buff) between cars to reduce damage to valuable lading and to prevent potential train separation or break-in-twos. It maintains train stops and slow downs to prevent the train from entering unauthorized territories that could cause accidents with other train traffic or work crews. It determines the optimum locomotive throttle setting and train brake application to minimize fuel consumption and wear of brake shoes and wheels. It monitors total locomotive performance, train brake performance and it provides advisement if performance is faulty. It forecasts the estimate time of arrival of train to various switch points, signals locations or final destinations to advise the engineer and rail traffic control centers. It records various key data for later downloaded analysis for operational studies and accident investigations as well as engineer qualifications.

The systems to date, including the LEADER system, attempt to analyze the performance of a operator's train handling techniques against a standard run, but do not take into account various operating constraints which occur during the run that differ from that which are part of the standard operating restraints. During the run, there may be a meet and pass order issued, order to the sidings for a stop issue as well as various changes in traffic signal designations. Also, standard operating conditions which are generally preset during a run may change during the run. These may include standing slow orders, track occupancy permits, speed restriction zones and general operating bulletins.

The present invention is a method of analyzing train handling by setting a standard run for a territory by collecting actual train operating data from a run across the territory and determining operating constraints during the run which are not included in the standard. The determination of operating constraints during a run also includes determining differences between the operating constraints during the run of those included in the standard. The train handling data is compared to the standard and the comparison is adjusted for the operating constraints. The adjustment of the comparison includes nullifying any deviation of the handling data from the standard resulting from the operating constraints. This modification includes substituting the operating data for the standard data for that section of the run in which the operating constraints occur. The boundaries of the section of the run is defined by one or more of the following handling data: speed, acceleration/deacceleration, slack action, propulsion settings, brake settings and position. All boundary conditions are met when performing the substitution.

The standard is set by determining operating practices which include one or more of speed limits, run-in/run-out force limitations and steady state draft and buff forces. This standard set also includes determining equipment limitations which includes one or more of time constants for change of tractive effort, time constants for change in dynamic braking and time constants for changing pneumatic braking. The standard includes one or more of the following operating restraints: standing slow orders, track occupancy permits, speed restriction zones and general operating bulletins. The operating constraints determined during the run includes one or more of meet and pass orders, traffic signal designation and order to sidings for a stop. The standard is set by weighting one or more of fuel usage, in-train forces and run duration. The standard is set and includes taking advantage of rail topology of the run in the use of braking and propulsion. The topology includes rail grade and curvature.

A report is created from the standard and the handling data correlating the energy usage for specific categories. These categories include one or more of pneumatic braking, dynamic braking and track topology. The report further includes energy modifications for the operating constraints determined during the run. The operating conditions not taken into account in the standard include stop and slow down orders. The report for pneumatic and dynamic braking includes energy for the following subcategories: slow downs, balancing grade and power braking. The energy determined and reported for track topology includes energy for curve resistance, grade resistance and rolling resistance.

Other advantages and novel features of the present invention will become apparent from the following detailed description of the invention when considered in conjunction with the accompanying drawings.

BRIEF DESCRIPTION OF THE DRAWINGS

FIG. 2 is an energy report according to the principles of the present invention.

DETAILED DESCRIPTION OF THE PREFERRED EMBODIMENTS

Figure 1:
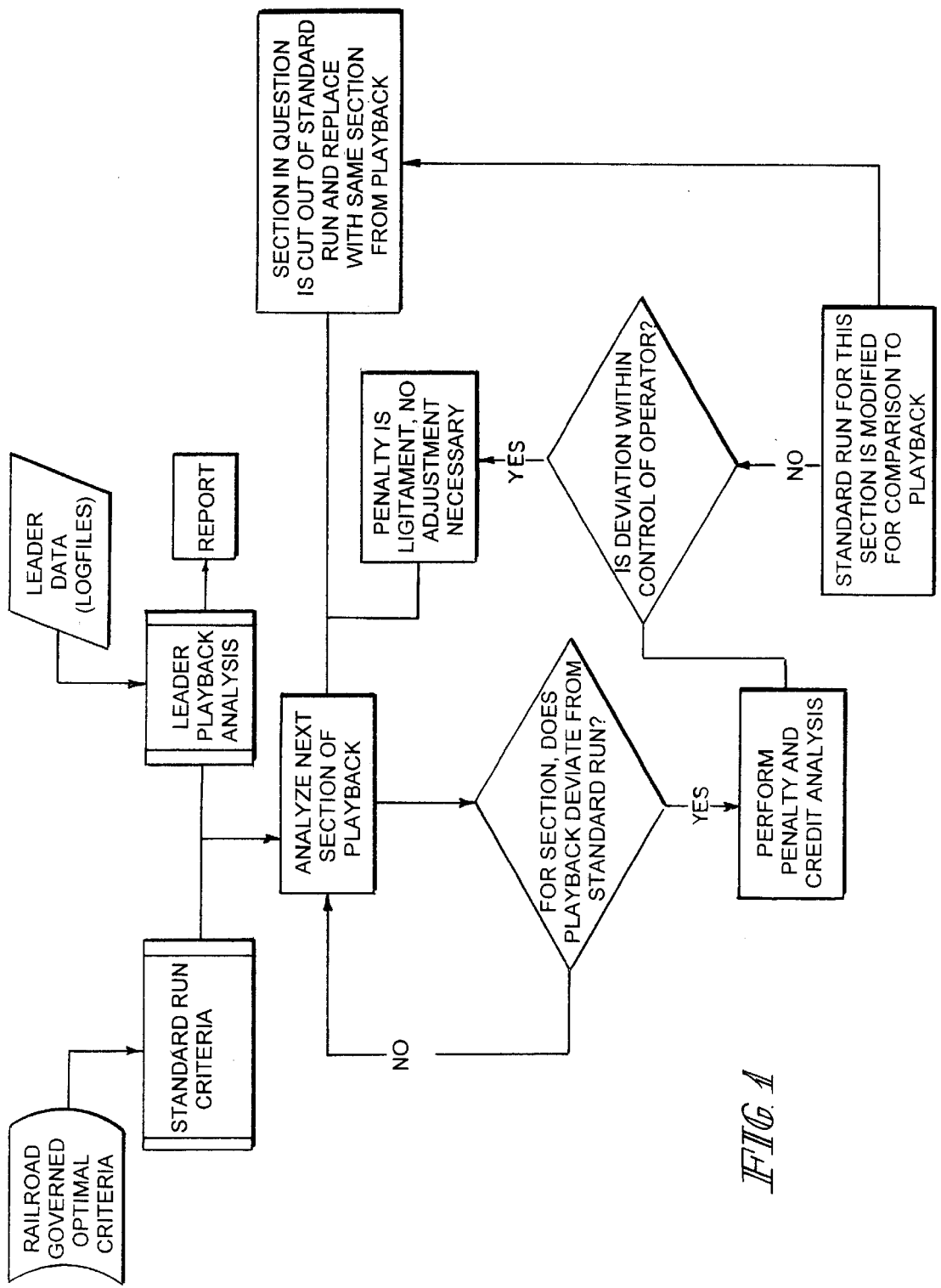
FIG. 1 is a flow chart of a train handling analysis according to the principles of the present invention.

The method of train handling techniques and analysis prepares a standard for a run and compares it against data from the actual run. Operating constraints which occur during the run which are not included in the standard or which are different from those included in the standard are determined. The train handling data is compared to the standard and the comparison is adjusted for the operating constraints determined during the run.

The flow chart of the implementation is illustrated in FIG. 1. The train handling data collected during the run is stored in the LEADER system data log files. This includes physical conditions and train characteristics. The consist information or train characteristics may include car length, car weight, car position in the consist, braking equipment description, types of bearings, wind drag areas. It also may include information on the locomotive including locomotive length, weight and position in the consist, traction performance, dynamic braking performance, fuel consumption as related to power control settings and locomotive speeds. It may further include propulsion system time constraints for increase and decrease of tractive effort, propulsion system time constraints for increase and decrease of dynamic brakes; and apply and release time constraints of the pneumatic brake system.

Additional information stored in the log file may be operational constraints for speed limits and special slow orders, speed restriction zones, meets and passes, track occupancy permits, general operating bulletins, upcoming signal designations, desired time of arrival, final destination location and limit of authority or track locations to which the train may move without the possibility of interfering with the movement of the trains in the area. Most of the operational constraints are provided by and as railroad governed optional criteria. The actual operational constraints from the log files determined during the run allows for adjustment of a standard run. Additional railroad governed criteria for the equipment include run-in/run-out forces limitations for a particular cargo and steady state draft and buff force limitations for coupling. Track profile including topography of elevation and curvature are also in the file logs. All of the information or data in the log file is correlated by location along the run.

The LEADER system train dynamic's calculations in playback analysis uses a combination of instrumented measurements on the locomotive and if available, from the cars, and a computer calculation based on the fundamental laws of physics, engineering mechanics along with various empirical derivations. The measurements include throttle and/or dynamic brake settings on the locomotive, control pressures of various locomotive air brake control systems and locomotive speed and incremental wheel rotation. Further, it calculates and uses power produced and/or anticipated within the locomotives traction system and locomotive wheel slip, activation of the locomotive sanders and whistle and or bells, the absolute track location and time of day are also inputs in the playback analysis. This is in addition to the consist information and track profile previously described.

The method used by LEADER system to conduct the optimization of train operation is described in U.S. Pat. No. 6,144,901 which is incorporated herein by reference. As indicated in FIG. 1, the standard run criteria and the LEADER system playback analysis is performed on sections of the run. Preferably, these sections of run, wherein optimization can be achieved, occur at locations of geographical features of interest. The geographic features of interest may include hills, valleys, curves, signals or siding. These are examples of features of interest which would benefit from individual car braking. Also, it defines different physical systems for analysis of a standard run.

After identifying the location of the car relative to the sites of geographical feature of interest, the operating parameters for operational constraints are determined. As previously discussed, they may include limits on forces or speed. Next, optimized weighted parameters from the railroad are derived taking into account the operational constraints. Examples of method of optimization may be to maximize fuel efficiency, minimize in-train forces or minimize time to destination. Dynamic brake affinity and pneumatic brake affinity can be weighted as well. These are also determined by the railroad. These weighted factors are combined and provided as an optimized weighted criteria. The weight for the undesired parameter may be given a zero weight.

The optimized weighted parameters are then used to calculate optimized operating parameters. For example, which car or locomotive to brake and what level of braking is necessary. For the locomotives, this would include pneumatic and dynamic braking as well as propulsion.

If all of the cars are not equipped with EP system brakes, the only control of the train is through the brake pipe to the individual cars as well as the brakes and the throttle on the locomotive. Thus, maximization of fuel efficiency, minimizing the in-train forces and minimizing time to destination would have to be controlled through the throttle and brake pipe. If the cars do not have individually controlled brakes, the optimized operating parameters are determined on the system level. If EP system brakes are available on the cars, braking of individual cars will produce optimum performance. If there is an anticipation that constraint limits are going to be reached, then the calculation of restraint operating parameters are performed. The calculation of which cars to brake and what level of brake is necessary as well as calculation of locomotive commands is performed. Alternatively, the braking and propulsion control is performed on the system level.

The calculations and the optimization are conducted not only for the present location of the train but looking ahead at the ensuing track profile. This is used to determine what change in the train conditions will result from the change in the track profile and location. Also, anticipation of a diminishing or increasing condition in track profile and train location will affect maintaining the train within the constraint boundaries.

Proportional controls of the locomotive traction power and dynamic braking include subsystems for managing a locomotive pulling effect and electric braking efforts. Proportional control of locomotive air brake subsystems includes both the application and the release of the independent locomotive brakes together or individually and the train or individual car brakes. The activation/deactivation of ancillary locomotive control systems include control of sanding, the horn and the bells.

Subset of the optimization is fuel optimization through the throttle setting including idle and judicious application of the various braking systems, pneumatic and dynamic. Locomotives operate at maximum efficiency at certain throttles.

While multiple locomotives are necessary to pull the train over certain areas, other areas in the same territory may not require all of the locomotives to be operational. LEADER system has the knowledge of the state of the train's current dynamics, the locomotive capacity, the train consist and the track profile ahead. Using this knowledge, LEADER system can determine the optimal combination of throttle settings on the locomotive to maximize efficiency. The setting can be from idle to notch 1-8 and vary independently on different locomotives in the same train.

Information on the train consist, locomotive parameters and dynamics, track profile and current throttle commands are used by the LEADER system processing algorithms to determine the train status. The determination is then made of the throttle settings are optimal for fuel efficiency.

A further extension of optimization using throttle settings is the ability to save fuel through shutdown and restart of the locomotives. Over the course of operation of a freight train, for example, a coal train operating in a loop spends a significant portion of the operating time moving totally empty cars. The amount of power required during a loaded move will generally determine the number and horse power of the locomotives in the train. All locomotives are generally operated during both the loaded and empty move in such a train, even though the empty train movement may not require all of the locomotives for propulsion. With the LEADER system's ability to look ahead and calculate required horse power for a certain section of a track, it is possible to shutdown an unneeded locomotives and save significant fuel. The LEADER system can continue to look ahead and determine if and when additional power will be necessary. It consumption and wear on the brake system.

The LEADER system measures train speed, time, track location and profile, locomotive throttle and brake control settings, consist to determine the optimum brake application required to maintain a safe speed. The safe speed may be optimized in combination with a longitudinal and lateral force level, minimum slack action and fuel usage. Using standard freight train dynamic modeling coupled with the measurements and the various data bases, the LEADER system predicts what brake control settings will be required to maintain the speed or to optimize the speed with other forces and fuel usage.

After the analysis of a particular section of playback has been completed, there is a determination of whether the playback data deviate from the standard run for that section. If not, the next section of playback is conducted. If the section does deviate from the standard run, then a penalty and credit analysis is performed.

The concept of the penalty and credit analysis is not intended to penalize the operator for operating constraints which are outside of the his control. These may include changes of the railroad governed optimal criteria included in the standard run criteria which are changed often. These include, for example, standing slow orders, track authority permits, general operating bulletins and speed restriction zones. Other constraints that may be known prior to the run but are more likely are subject to changes during the run may include, but are not limited to, meet and pass order from a central dispatch, order to a siding for a stop and traffic signal designations. Other changing conditions include for example, rail conditions, would then command the engines to restart with proper warm up time to be available when required.

Another limitation on the system's ability to control the in-train forces and fuel efficiency is that on most trains, although the freight brakes can be gradually applied, they cannot be gradually released. Once a brake is released by the locomotive engineers, the brake will completely release. After a brake application is initiated, it may take up to one minute or longer to fully apply the brakes throughout a train with, for example, 100 cars. A full release of a brake system will also take a minute or longer. The time required is depended upon the length of the train and the specific type of brake valves on the cars. Thus, a common problem faced by the locomotive engineers to determine the extent to which the brakes must be applied or released.

If an engineer is moving down a grade that requires a brake application to maintain a safe speed, a sufficient application must be made to prevent the train from gaining too much speed. If too much brake is applied, the train may slow down and eventually stop or stall. Ideally, sufficient brake is applied to balance the effect of the grade.

If too much brake is applied, there are two choices.

The brakes can be released and re-applied, which will take two or more minutes. This may result in the train gaining too much speed before the brakes are reapplied and therefore being a "runaway". The other alternative is to apply the locomotive power propulsion to compensate for the excessive brake application. This is known as "power braking".

Although resulting in a reasonable control of train speed, it increases the cost of energy, fuel traffic or weather conditions. Since all of these are outside the operator's control, it is unfair to penalize the operator for such deviations from the optimum.

Another method of defining boundaries are boundary conditions which include, but are not limited to, speed, acceleration, slack action in the train, propulsion settings, brake settings and track position. The previously described limitations are mostly geographical.

The next determination made is whether or not the deviation was within the control of the operator. If that segment of track includes an operational constraint which is not included in the standard run criteria or a change of an operating constraints which deviate from the standard run criteria, then the deviation is considered not to be under the control of the operator. In all other cases, the penalties for inefficient operation of the train system will be charged against the operator and no adjustment to the standard run is required.

One method of modification is cutting out the standard run section and replacing with the same section from the playback. This in effect nullifies any deviation of the handling data from the standard resulting from the operating constraints. This system is preferred since the total time, fuel consumption or other criteria to be measured are included. Alternatively, if just a total of the deviation is required, that section of the optimum or standard run and the playback can be totally zeroed out or nullified. Upon accommodating these variations, the next section of playback is analyzed.

Upon a completion of analyzing the complete run, a report is generated. An example of a report is illustrated in FIG. 2. The report summarizes an analysis, and shows where energy is used in an operating train or particular area. The Law Of Conservation Of Energy demand that total energy in a system may neither create nor destroy, only transfer from one state to another. The report or Energy Accounting Ledger reveal different areas of energy used and how much energy is used in each area and creates a comparison of energy usage in an actual run to the standard or optimal run. Thus, it identifies not only the areas of deviation, but the magnitude. With the addition of penalty and credit analysis, the Energy Accounting Ledger offers a fair and accurate view of potential energy savings.

As illustrated, the power demand and the fuel used is shown in various areas. The application of the air brakes or dynamic brakes during slow down, balancing grade and power braking are shown, as well as the additional propulsion energy required to get back up to speed. In addition, various categories related to the track topology namely, curve resistance, grade resistance and rolling resistance are shown. Fuel consumed during idle is also shown.

Penalties and credits are shown in the table for stops and slow downs. In the particular run illustrated, a stop order not included in the optimal run required an additional 82 gallons of fuel. A slow down penalty required 28 gallons of fuel, while a slow down credit amounted to six gallons of fuel. Thus, 110 gallons of fuel were added to the optimum run as a penalty and six gallons of fuel were subtracted for a credit producing net effect of 104 gallons of fuel being added to optimum run for comparison against the playback or actual train data. The optimum run illustrated shows 198 gallons of potential savings compared to a typical playback.

The curve and grade resistance computations are used to anticipate the upcoming error demanded for the section ahead. This anticipated energy demand is used to estimate the appropriate propulsion or braking setting for an optimal energy consumption. These generally take advantage of gravity and resistance.

The method of FIG. 1 and the analysis report of FIG. 2 can also be used as a basis for simulating various modifications to the track to determine rate of return of investment. In the same example, curve resistances is estimated to account for 200 gallons of fuel across the run illustrated. A simulation of the same run with a substantial reduction in curvature, for example, is estimated to require only 100 gallons of fuel for curve resistance. A railroad, knowing how many trains use the run daily, can calculate the savings to be realized annually. Such savings can be compared to the cost of modifying the track. On this basis, a prudent engineering and fiscal decision can be made.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of analyzing train handling comprising:
    setting a standard for a run;
    collecting train handling data from the run;
    determining operating constraints during the run which are not included in the standard;
    comparing the train handling data to the standard; and
    modifying the comparison for the determined operating constraints.

2. A method according to claim 1, wherein the standard, the handling data and operating constrains are correlated for a respective section of the run.

3. A method according to claim 2, wherein the comparison is modified by nullifying any deviation of the handling data from the standard for that section of the run that includes the operating constraint.

4. A method according to claim 2, wherein the comparison is modified by substituting the handling data for the standard in the section.

5. A method according to claim 2, including defining boundaries of the sections using one or more of the following handling data: speed, acceleration/deceleration, slack action, propulsion settings, brake settings and position.

6. A method according to claim 1, wherein the modification includes substituting the handling data of the standard for that section of the run in which an operating constraint occurred.

7. A method according to claim 6, including defining boundaries of the sections using one or more of the handling data: speed, acceleration/deceleration, slack action, propulsion settings, brake settings and position.

8. A method according to claim 1, wherein setting the standard includes determining equipment limitations which includes one or more of time constants for change of tractive effort, time constants for changes in dynamic braking and time constants for changes in pneumatic braking.

9. A method according to claim 1, wherein determining operating constraints also includes determining differences between operating constrains during the run and those included in the standard.

10. A method according to claim 1, wherein the standard is set by weighting one or more of fuel usage, in-train forces and run duration.

11. A method of creating an energy report of a train run comprising:
    determining the amount of energy of a train run related to each of pneumatic braking, dynamic braking and track topography; and
    displaying the results.

12. A method according to claim 11, including setting a standard amount of energy for the pneumatic braking, dynamic braking and track topography and displaying it with the respective determined value.

13. A method according to claim 10, including determining and displaying energy of the train run related to idle.

14. A method according to claim 10, wherein the amount of energy is determined for pneumatic and dynamic braking for slow downs, balancing grade and power braking and displayed.

15. A method according to claim 10, wherein the amount of energy is determined for rail topography for curve resistance, grade resistance and rolling resistance and displayed.

16. A method according to claim 12, including determining and displaying energy related to operating conditions of the run not taken into account in the standard amount.

17. A method according to claim 16, wherein the operating conditions include stop and slow down orders.

18. A method of analyzing train handling comprising:
    setting a standard for a run;
    collecting train handling data from the run;
    determining operating constraints during the run which are not included in the standard;
    comparing the train handling data to the standard; and
    modifying the comparison for the determined operating constraints including nullifying any deviation of the handling data from the standard resulting from the operating constraints.

19. A method of analyzing train handling comprising:
    setting a standard for a run including determining operating practices which include one or more of speed limits, run-in/run-out force limitations and steady state draft and buff forces;
    collecting train handling data from the run;
    determining operating constraints during the run which are not included in the standard;

comparing the train handling data to the standard; and modifying the comparison for the determined operating constraints.

20. A method of analyzing train handling comprising:

setting a standard for a run using one or more of the following operating constraints: standing slow orders, track occupancy permits, spaced restriction zones and general operating bulletins;

collecting train handling data from the run;

determining operating constraints during the run which are not included in the standard;

comparing the train handling data to the standard; and modifying the comparison for the determined operating constraints.

21. A method of analyzing train handling comprising:

setting a standard for a run;

collecting train handling data from the run;

determining operating constraints, including one or more of meet and pass orders, traffic signal designations and order to siding for a stop, during the run which are not included in the standard;

comparing the train handling data to the standard; and modifying the comparison for the determined operating constraints.

22. A method according to claim 21, wherein other operating constraints determined during the run for comparison to operating constraints included in the standard includes one or more of standing slow orders, track occupancy permits, speed restriction zones and general operating bulletins.

23. A method of analyzing train handling comprising:

setting a standard for a run taking advantage of rail topography of the run in the use of braking and propulsion;

collecting train handling data from the run;

determining operating constraints during the run which are not included in the standard;

comparing the train handling data to the standard; and modifying the comparison for the determined operating constraints.

24. A method according to claim 23, wherein the rail topography includes rail grade and curvature.

25. A method of analyzing train handling comprising:

setting a standard for a run;

collecting train handling data from the run;

determining operating constraints during the run which are not included in the standard;

comparing the train handling data to the standard;

modifying the comparison for the determined operating constraints; and creating an energy usage report from the standard and the handling data which correlates the energy usage for specific categories.

26. A method according to claim 25, wherein the categories include one or more of pneumatic braking, dynamic braking and track topography.

27. A method according to claim 25, wherein the report further includes energy modifications for the operating constraints.

* * * * *

UNITED STATES PATENT AND TRADEMARK OFFICE
CERTIFICATE OF CORRECTION

PATENT NO. : 6,332,106 B1
DATED : December 18, 2001
INVENTOR(S) : Michael J. Hawthorne, Stephen K. Nickles and Bolanle Onodipe It is certified that error appears in the above-identified patent and that said Letters Patent is hereby corrected as shown below:

<u>Column 5,</u>
Lines 32-62, delete beginning with "consumption" ending with "rail conditions,".

<u>Column 6,</u>
Line 26, insert the following between "fuel" and "traffic":
-- consumption and wear on the brake system.
     The LEADER system measures train speed, time, track location and profile, locomotive throttle and brake control settings, consist to determine the optimum brake application required to maintain a safe speed. The safe speed may be optimized in combination with a longitudinal and lateral force level, minimum slack action and fuel usage. Using standard freight train dynamic modeling coupled with the measurements and the various data bases, the LEADER system predicts what brake control settings will be required to maintain the speed or to optimize the speed with other forces and fuel usage.
     After the analysis of a particular section of playback has been completed, there is a determination of whether the playback data deviate from the standard run for that section. If not, the next section of playback is conducted. If the section does deviate from the standard run, then a penalty and credit analysis is performed.
     The concept of the penalty and credit analysis is not intended to penalize the operator for operating constraints which are outside of the his control. These may include changes of the railroad governed optimal criteria included in the standard run criteria which are changed often. These include, for example, standing slow orders, track authority permits, general operating bulletins and speed restriction zones. Other constraints that may be known prior to the run but are more likely are subject to changes during the run

UNITED STATES PATENT AND TRADEMARK OFFICE
CERTIFICATE OF CORRECTION

PATENT NO. : 6,332,106 B1
DATED : December 18, 2001
INVENTOR(S) : Michael J. Hawthorne, Stephen K. Nickles and Bolanle Onodipe It is certified that error appears in the above-identified patent and that said Letters Patent is hereby corrected as shown below:

may include, but are not limited to, meet and pass order from a central dispatch, order to a siding for a stop and traffic signal designations. Other changing conditions include for example, rail conditions, --

Signed and Sealed this

Fourth Day of February, 2003

JAMES E. ROGAN
*Director of the United States Patent and Trademark Office*